(12) United States Patent
De Gevay

(10) Patent No.: US 6,820,667 B2
(45) Date of Patent: Nov. 23, 2004

(54) DUAL COMPARTMENT TIRE

(76) Inventor: Francois M. De Gevay, 1000 Caballo Blvd., Las Vegas, NV (US) 89014

( * ) Notice: Subject to any disclaimer, the term of this patent is extended or adjusted under 35 U.S.C. 154(b) by 61 days.

(21) Appl. No.: 10/303,135

(22) Filed: Nov. 25, 2002

(65) Prior Publication Data

US 2004/0099360 A1 May 27, 2004

(51) Int. Cl.$^7$ .............................. B60C 5/22; B60C 17/01
(52) U.S. Cl. .................................. 152/342.1; 152/339.1; 152/518
(58) Field of Search ........................... 152/339.1, 342.1, 152/157, 341.1, 340.1, 331.1, 165, 166, 518

(56) References Cited

U.S. PATENT DOCUMENTS

| | | | | |
|---|---|---|---|---|
| 1,438,257 A | * | 12/1922 | Mundell | 152/342.1 |
| 1,989,402 A | * | 1/1935 | Cupp | 152/340.1 |
| 2,169,041 A | | 8/1939 | Gammeter | |
| 2,189,485 A | | 2/1940 | Crowley | |
| 2,237,245 A | * | 4/1941 | Wilson et al. | 152/342.1 |
| 2,242,788 A | * | 5/1941 | Marks | 152/339.1 X |
| 2,731,061 A | | 1/1956 | Clark | |
| 2,735,471 A | * | 2/1956 | McLean | 152/340.1 X |
| 2,754,875 A | | 7/1956 | King | |
| 2,934,127 A | * | 4/1960 | Howard | 152/341.1 X |
| 2,964,084 A | | 12/1960 | Tubbs | |
| 3,074,454 A | | 1/1963 | Tubbs | |
| 3,161,219 A | * | 12/1964 | Danhi | 152/339.1 |
| 3,191,654 A | | 6/1965 | Anderson | |
| 3,318,325 A | | 5/1967 | Siedow | |
| 3,616,831 A | * | 11/1971 | LaFuente et al. | 152/342.1 |

FOREIGN PATENT DOCUMENTS

| | | | | |
|---|---|---|---|---|
| CA | 2184513 A | * | 9/1997 | |
| FR | 1.468.866 | * | 2/1967 | 152/342.1 |

* cited by examiner

*Primary Examiner*—Adrienne C. Johnstone
(74) *Attorney, Agent, or Firm*—Harry M. Weiss; Jeffrey Weiss; Weiss, Moy & Harris, P.C.

(57) ABSTRACT

A dual compartment tire has a primary air compartment and a secondary air compartment that is internal to the primary air compartment. During ordinary travel, the primary air compartment is in contact with the road surface, with the secondary air compartment constituting an integral spare tire in the event of a flattening of the primary air compartment. Each of the primary and secondary air compartments is bounded by an exterior surface. In contrast to prior art dual compartment tires, the exterior surface of the secondary air compartment is relatively thicker than the exterior surface of the primary air compartment.

1 Claim, 1 Drawing Sheet

DUAL COMPARTMENT TIRE

FIELD OF THE INVENTION

This invention relates generally to dual compartment safety tires and methods therefore and, more particularly, to a safety tire and method having a heavy duty inner tire bounded by a relatively thick road surface and an outer tire bounded by a relatively thin road surface.

BACKGROUND OF THE INVENTION

As is well-known, a flat tire can cause inconvenience and, if occurring while a vehicle is moving, is potentially hazardous. Where the vehicle is moving, a sudden blow-out can cause a driver to lose control, with potentially disastrous consequences. Where the vehicle is stationary when the flat occurs, or when the flat does not occur a driver to lose control of a moving vehicle, there remains the matter of replacing the flat tire. If the vehicle owner either lacks a spare tire or is unable to change the flat tire for whatever reason, the driver will be stuck.

There are a number of prior art patents directed to dual compartment tires, where a flat in the outer compartment leaves an inflated inner compartment. The purpose of these designs is to permit a driver to maintain control in the event of a blowout, and to drive for assistance where it is inconvenient or impractical for the driver to change a flat himself or herself. These include, by way of example, patents issued to Howard (U.S. Pat. No. 2,934,127); Tubbs (U.S. Pat. No. 3,074,454); and King (U.S. Pat. No. 2,754,875).

However, prior art dual compartment tires such as the ones disclosed in these references comprise an outer tire compartment bounded by a relatively thick road surface and an inner tire bounded by a relatively thin road surface. This design makes the inner tire vulnerable to itself becoming flat upon use, and thus impractical for use as a temporary spare tire.

A need therefore existed for a dual compartment tire having a heavier duty inner tire compartment, and thus one that could be more practically relied upon for use as a temporary spare tire. Specifically, a need existed for a dual compartment tire having a heavy duty inner tire bounded by a relatively thick road surface and an outer tire bounded by a relatively thin road surface. The present invention satisfies these needs and provides other, related, advantages.

SUMMARY OF THE INVENTION

It is an object of the present invention to provide a dual compartment tire having a heavier duty inner tire compartment versus prior art dual compartment tires.

It is a further object of the present invention to provide a dual compartment tire having a heavy duty inner tire bounded by a relatively thick road surface and an outer tire bounded by a relatively thin road surface.

BRIEF DESCRIPTION OF THE PREFERRED EMBODIMENTS

In accordance with one embodiment of the present invention, a dual compartment tire is disclosed. The dual compartment tire comprises, in combination: a primary air compartment having a relatively thin exterior surface; and a secondary air compartment internal to the primary air compartment and having a relatively thicker exterior surface.

In accordance with another embodiment of the present invention, a method for providing a more durable secondary air compartment for a dual compartment tire is disclosed. The method comprises the steps of: providing a primary air compartment having a relatively thin exterior surface; providing a secondary air compartment internal to the primary air compartment and having a relatively thicker exterior surface; and filling each of the primary air compartment and the secondary air compartment with air.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
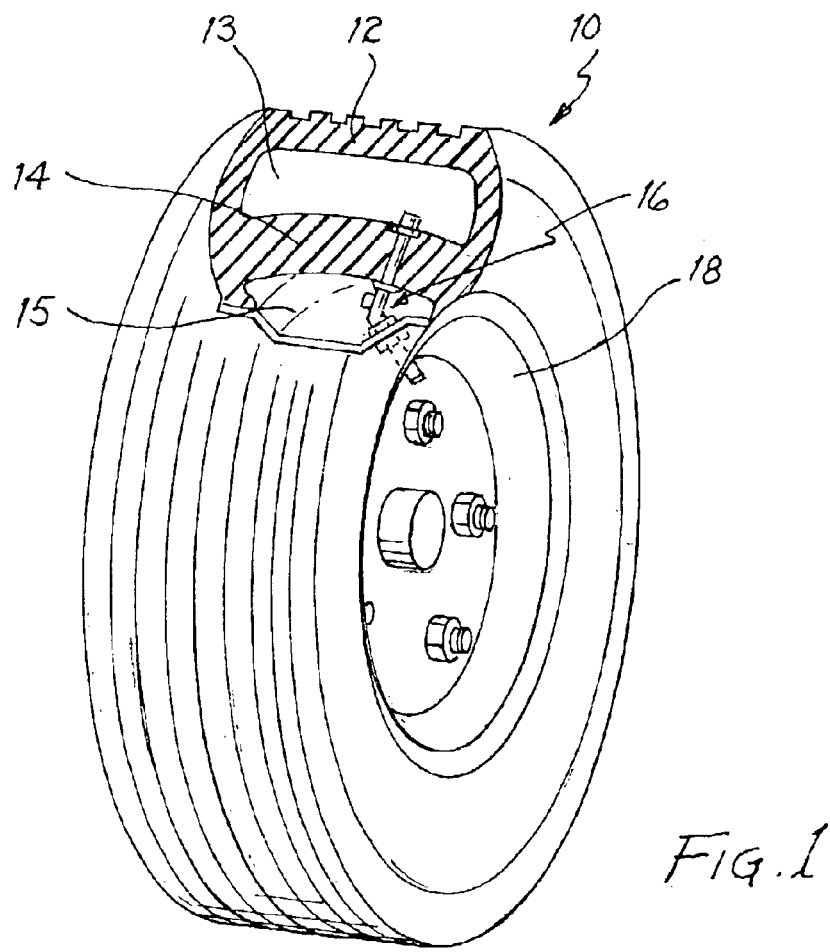
FIG. 1 is a perspective, partially cut-away view illustrating an embodiment of a dual compartment tire consistent with the present invention.
Figure 2:
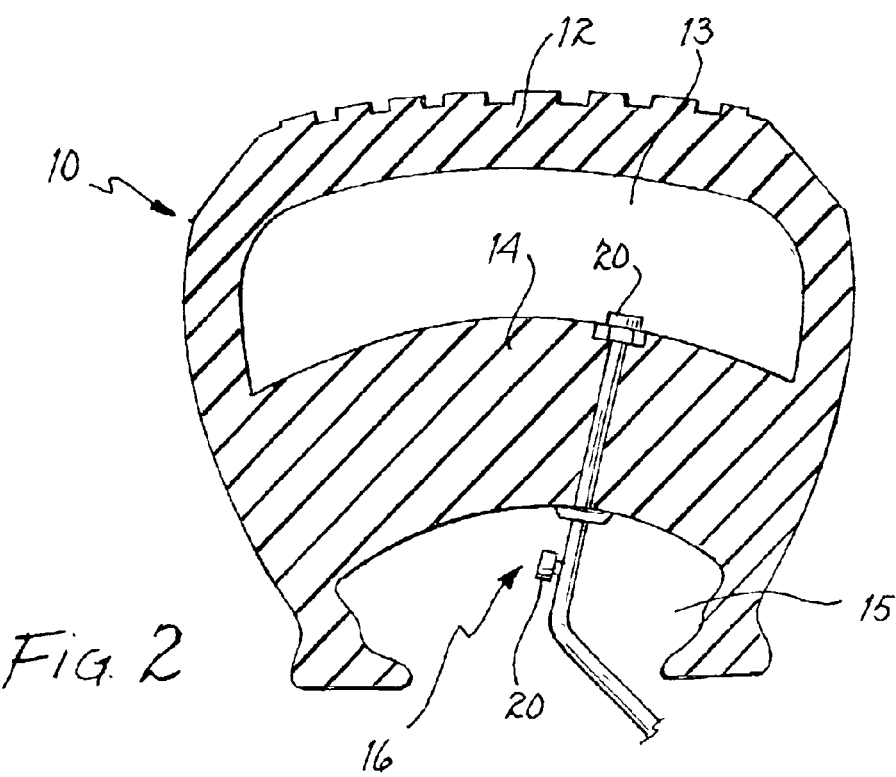
FIG. 2 is a front cross-sectional view of an embodiment of a dual compartment tire consistent with the present invention.

Referring to FIGS. 1–2, an embodiment of a dual compartment tire 10 consistent with the present invention is illustrated. The dual compartment tire 10 includes a primary exterior surface 12 bounding a tubeless primary air compartment 13 secondary exterior surface 14 bounding a tubeless secondary air compartment 15.

The secondary air compartment 15 is internal to the primary air compartment 13. During ordinary travel, the primary air compartment 13 is in contact with the road surface, with the secondary air compartment 15 constituting an integral spare tire in the event of a flattening of the primary air compartment 13. In the event that primary air compartment 13 becomes deflated or blown out, it is intended that travel will still be possible on an inflated secondary air compartment 15.

Preferably, a single fill valve 16 extends through wheel 18 and into each of primary air compartment 13 and secondary air compartment 15. Moreover, in each of primary air compartment 13 and secondary air compartment 15 is located a port 20, through which air pumped into fill valve 16 may enter. In this fashion, a user is able to simultaneously fill each of primary air compartment 13 and secondary air compartment 15 via a single fill valve 16. Specifically, the single fill valve 16 is a single fill valve member comprising a single conduit having one exit port 20 at an end portion of the single conduit in fluid communication with the primary air compartment and having a second exit port 20 spaced from the one exit port 20 and in fluid communication with the secondary air compartment, the single conduit having a portion intermediate the one exit port 20 and the second exit port 20 and extending through the relatively thicker exterior surface of the secondary air compartment.

Alternatively, it would be possible to configure the dual compartment tire 10 so as to provide independent fill valves for each of the primary air compartment 13 and secondary air compartment 15.

In both FIGS. 1 and 2, it can be seen that the primary exterior surface 12 is relatively thinner than the secondary exterior surface 14. The provision of a thicker secondary exterior surface 14 is intended to increase the durability and safety of the secondary air compartment 15.

For example, in the event of a blow-out during travel, a relatively thick exterior surface 14 is expected to be able to accept the strain of the attending sudden increase in external pressure. Moreover, travel on the secondary air compartment 15 should be more secure, and should be permitted for greater distance and over more difficult to terrain, as compared to prior art dual air compartment tires wherein the secondary air compartment is bounded by a relatively thin exterior surface.

While the invention has been particularly shown and described with reference to preferred embodiments thereof, it will be understood by those skilled in the art that the foregoing and other changes in form and details may be made therein without departing from the spirit and scope of the invention.

I claim:

1. A dual compartment tubeless vehicle tire comprising in combination:

a tubeless primary air compartment having a relatively thin exterior surface;

a tubeless secondary air compartment internal to said tubeless primary air compartment and having a relatively thicker exterior surface;

a single fill valve member comprising a single conduit having one exit port at an end portion of said single conduit in fluid communication with said tubeless primary air compartment and having a second exit port spaced from said one exit port and in fluid communication with said tubeless secondary air compartment said single conduit having a portion intermediate said one exit port and said second exit port and extending through said relatively thicker exterior surface of said tubeless secondary air compartment;

wherein, when said tubeless primary and secondary air compartments are inflated for ordinary vehicle travel on a road surface, said tubeless primary compartment is in contact with said road surface during said ordinary vehicle travel, but in the event that said tubeless primary air compartment becomes deflated or blown out, vehicle travel will still be possible on said inflated tubeless secondary air compartment.

* * * * *